United States Patent [19]

Sapp et al.

[11] 3,869,421

[45] Mar. 4, 1975

[54] RESILIENT OIL-EXTENDED POLYURETHANE SURFACES

[75] Inventors: George G. Sapp, San Pablo; Joseph L. Goodrich, Lafayette, both of Calif.

[73] Assignee: Chevron Research Company, San Francisco, Calif.

[22] Filed: Dec. 11, 1972

[21] Appl. No.: 314,060

Related U.S. Application Data

[63] Continuation-in-part of Ser. No. 129,130, March 29, 1971, abandoned, which is a continuation-in-part of Ser. No. 54,013, July 10, 1970, abandoned.

[52] U.S. Cl.......... 260/33.6 AQ, 161/162, 161/164, 161/190, 161/403, 260/9, 260/33.6 UB, 260/37 N, 260/859 R, 260/998.19
[51] Int. Cl............................................. C08g 51/28
[58] Field of Search .. 260/33.6 AQ, 33.6 UB, 37 N, 260/9

[56] References Cited
UNITED STATES PATENTS

| | | |
|---|---|---|
| 3,136,732 | 6/1964 | Kaestner .......................... 260/37 N |
| 3,272,098 | 9/1966 | Buchholtz ......................... 260/37 N |
| 3,450,653 | 6/1969 | McClellan ......................... 260/37 N |
| 3,549,472 | 12/1970 | King ....................................... 260/9 |
| 3,627,856 | 12/1971 | Thienot ....................... 260/33.6 AQ |
| 3,637,558 | 1/1972 | Verdol ................................. 260/28 |
| 3,714,110 | 1/1973 | Verdol ....................... 260/33.6 AQ |

Primary Examiner—Morris Leibman
Assistant Examiner—P. R. Michl
Attorney, Agent, or Firm—G. F. Magdeburger; C. J. Tonkin; B. G. Fehringer

[57] ABSTRACT

Resilient surfaces are provided, which are easy to apply and have excellent tensile properties. A castable mixture is prepared combining a nonvolatile oil-based extender, resilient aggregate, carbon black, and a polyurethane prepared from diols, the major portion of which is a diol of from about 1,000 to 5,000 molecular weight, wherein the hydroxyl groups of the diol are joined by long-chain hydrocarbon groups substantially free of hetero atoms in the chain itself. The resilient surface sets up quickly to a useful surface and will generally be no greater than about 2 inches in depth.

11 Claims, No Drawings

3,869,421

RESILIENT OIL-EXTENDED POLYURETHANE SURFACES

CROSS-REFERENCE TO RELATED APPLICATIONS

This application is a continuation-in-part of application Ser. No. 129,130, now abandoned, which is a continuation-in-part of application Ser. No. 54,013, filed July 10, 1970, now abandoned.

BACKGROUND OF THE INVENTION

1. Field of the Invention

Recent years have seen the development of various resilient surfacing materials. These materials have found particular use in indoor and outdoor recreational applications such as for running tracks, athletic fields, golf tees, golf greens, horse stables (stalls), playground surfaces, and tracks for horse-racing events.

Ideally, the resilient surfacing materials should have several characteristics. They should be easy to apply, not requiring a great deal of expertise to lay a suitable surface. The ingredients of the surfacing composition should be inexpensive. They should be safe to handle, and surface installation should not require elaborate metering equipments and elaborate mixing equipment at the installation sites.

The compositions should set into a usable surface in a relatively short time, thereby avoiding the effects of inclement weather and providing surfaces usable for athletic events in a short time. They should also be substantially free from shrinkage to avoid high internal stresses which may cause pulling away from (1) the forms used to contain the poured material, and (2) the base. They should also have sufficient gel properties to resist flow or sag upon casting on the gentle slopes used in athletic and recreational surfaces. Characteristics which are particularly desirable in a finished surface include resilience to reduce muscular fatigue, resistance to wear caused by impact of spikes, horseshoes, etc.; resistance to light and oxidation-induced damage; attractive coloring; sufficient traction for running or walking, etc,; the ability to be applied either as a porous or non-porous surface, depending upon the particular application requirements; and the ability to withstand damage caused by freezing and thawing of water in contact with the surface.

A particularly advantageous property for the resilient surfacings is the ability to be applied in drainable, porous form. This imparts significant advantages in construction, dispensing with the very difficult job of providing such accurate leveling as to prevent puddle formation during rains. The finished porous surfaces allow participation in athletic events upon the surfaces during a rain without the difficulties encountered with a water-covered surface.

Also, a properly constructed, non-porous surface should maintain high skid resistance even when the surface is wet.

Another advantageous characteristic of recreational surfacing materials is flame-resistance, so that an accidentally dropped match will not cause loss due to fire destruction.

While in the past, various combinations of materials have been used to provide surfaces for recreational and athletic activity, no previously known surfacing material has provided the excellent combination of properties which have been described above, together with low cost and ease of installation.

The resilient compositions of this invention may also find uses as median strips for highways and the like, protective coatings or other indoor and outdoor applications where a resilient mat may be needed.

2. Description of the Prior Art

The use of resilient recreational surfaces is illustrated in U.S. Pat. No. 3,272,098, where a rubber and mineral aggregate-filled polyurethane system is disclosed. U.S. Pat. 3,338,861 teaches a method of making a plasticized polyurethane composition by combining (1) an extender oil, (2) a polyurethane, and (3) carbon black.

Also pertinent are bulletins by Sinclair Petrochemicals, Inc. concerning Poly-B-D liquid resins: *Product Data Bulletin*, No. 505, *Product Data Bulletin*, No. 506, and *Preliminary Product Data Bulletin*, No. 507, issued June, 1967, August, 1967, and October, 1967, respectively. Similar information may be found in French Patents Nos. 1,483,693 and 1,485,817.

U.S. Pat. No. 3,427,366 teaches a rubber filled polyurethane system prepared using a hydroxy terminated diene intermediate polymer into which can be blended fillers such as carbon black, extender oils, and pigments.

U.S. Pat. No. 2,877,212 discloses polymeric reaction products of diisocyanates and diols to form elastomers. The products may be varied by suitable compounding with carbon black, clay, silica, and other mineral fillers and may also be extended with suitable solvents to permit their application as coatings.

U.S. Pat. No. 3,390,119 shows a coating composition of a polyurethane and a petroleum derived oil extender which may include a mineral filler such as silica, china clay and the like and also carbon black.

SUMMARY OF THE INVENTION

A resilient surface is obtained by casting a mixture containing an oil-extended polyurethane and a resilient aggregate. A premixed composition contains an extender oil, carbon black, a high molecular weight polyol, and preferably (1) a mineral filler and (2) a drying agent. A polyisocyanate of at least 6 carbon atoms and the resilient aggregate are added to the other premixed constituents in the presence of a catalyst. The polyisocyanate, resilient aggregate, and the other premixed constituents are substantially homogeneously mixed and the resulting composition is cast onto a surface to provide a rapid-curing, resilient pavement. The pavement will normally be up to about 2 inches in thickness, preferably from about one-eighth to three-fourth inch, and ready for use within about 1 to 2 days, although the final tensile properties may not be reached for a somewhat longer time.

DESCRIPTION OF THE INVENTION

A resilient surface is prepared by (I) mixing together to form a pourable premix composition having a viscosity in the range of 4,000 to 100,000 centipoises at 77°F. (Brookfield viscometer, 10 RPM, No. 6 spindle), preferably 15–35,000 centipoises, an extender oil; a high molecular weight polyol, primarily diol; carbon black; preferably (1) a mineral filler and (2) a drying agent, and usually a catalyst for curing polyurethane, (II) adding to this premix composition under conditions of agitation (1) a resilient aggregate and (2) a polyisocyanate having at least 6 carbon atoms and usually no more than 46 carbon atoms, and (III) casting the resulting mixture onto a surface in a thickness of up to about 2 inches. The pavement may then be worked for a short period of time to insure a smooth surface. Normally, all tackiness is gone within a few hours, and the pavement is in usable form within 1 to 2 days. Within 1 to 2 weeks, the surface has substantially achieved its ultimate tensile properties.

The premix composition described above must have a Brookfield Yield Value of at least 10 (as defined in Example 11). This minimum is required so that the applied composition containing the premix composition, the resilient aggregate and the isocyanate will not sag when applied to a surface having a slope to facilitate drainage. The maximum yield value is preferably no greater than about 100. However, the only limitation is that the resulting mixture (containing the premix composition, resilient aggregate and isocyanate) be capable of being worked to form the desired surface.

While the above method and order of addition of the constituents is preferred, the only criticality in the order of addition of constituents in the combination which is used is that the polyurethane not be prepared, but be prepared in situ. This means that the diol and polyisocyanate should not be combined. particularly in the presence of catalyst, prior to the final mixing of all the ingredients. However, the resilient aggregate may be incorporated in the premix composition made up of the extender oil, the long chain hydrocarbon polyol, carbon black, mineral filler, and catalyst; placed in drums and transported to the site where the polyisocyanate is added.

The proportions of the various ingredients in the mixture to be used to prepare the surface may be varied to a significant degree. All parts hereafter are by weight. The amount of (1) extender oil will be at least 1 part and not more than about 5 parts per part of the (2) polyol, preferably from 2 to 3 parts. The (3) resilient aggregate may vary (in the non-porous structure) from about 0.5 part to about 5 parts per part of polyol, preferably from about 1 to about 3, and more preferably from about 1 to about 2, the (4) carbon black will vary from about 0.15 to about 0.5 part per part of polyol; the (5) mineral fillers will vary from 0 to about 2 parts per part of polyol, the (6) drying agent may be present in an amount of from 0 to 0.5 parts per part of polyol.

The amount of catalyst may vary depending upon the rate of cure of the polyurethane which is desired. Normally, the amount of (7) catalyst will be from about zero to about 0.5 weight percent based on the hydrocarbon polyol. The composition made up of (1) through (7) above may be considered a premix composition to which is added the isocyanate at the time the surface is to be formed. A preferred premix, however, consists of items (1), (2), and (4) through (7) with the resilient aggregate being added on site along with the isocyanate.

A preferred aspect of this invention is to include with the high molecular weight polyol from 5 to 20 weight percent based on total polyol of a short chain polyol having 2 to 3 hydroxyl groups, the total amount of polyol remaining as specified above. The low molecular weight polyol will have a molecular weight in the range of 62 to 300. The polyol may have ether linkages, amine nitrogen or other hetero atoms, between the hydroxyl groups and may be aromatic. Useful short chain polyols include butane diol, polypropylene glycols and the like. An example of a polypropylene glycol is Pluracol P-245 available from Wyandotte Chemical Co. A preferred short chain polyol is N,N-bis(2-hydroxypropyl)aniline.

The polyisocyanate is added in a ratio of from 0.8 to about 1.6 equivalents of isocyanate groups per equivalent of hydroxyl groups. preferably 0.95 to 1.5 equivalents of isocyanate groups is added per equivalent of hydroxyl groups. Most preferably, the number of isocyanate groups added is at least equivalent to the number of hydroxyl groups available from the polyols. The parts by weight of polyisocyanate per parts by weight of total polyol will be from about 0.10–0.75:1.

The ratios of materials in the final surface will be similar to the premixed composition subject to some accomodation for the addition of the polyisocyanate. Basing the weight ratio on the combined weight of the polyisocyanate and polyol, i.e., on the (1) polyurethane formed, the amount of (2) extender oil will be from about 0.6 to about 4.5 parts per part of polyurethane, preferably from about 1.5 to 3 parts. The (3) resilient aggregate will be present in the non-porous structure in from about 0.25 to about 4.5 parts per part of polyurethane, preferably from about 0.75 to about 2.5 parts. The (4) mineral filler will be present in an amount of from 0 to about 1.8 parts per part of polyurethane, preferably in an amount of from 0.3 to 1.0 parts, and the (5) drying agent will be present in an amount of from 0 to about 0.5 parts. The (6) carbon black will be present in an amount of from about 0.08 to about 0.45 parts, preferably in an amount of from 0.1 to 0.3 parts.

At least about 12 and not more than about 60 weight percent, more usually at least 20 and not more than 50 weight percent of the non-porous structure will be extender oil, while at least about 5 and not more than about 35 weight percent of the total composition, preferably at least 10 and not more than 25 weight percent of the non-porous structure will be polyurethane.

In carrying out the method of this invention, it is convenient to first combine the extender oil, polyols, carbon black, catalyst, and (1) mineral filler and (2) drying agent, if the latter two are used, and mix to a homogeneous mass. The drying agent may be included to prevent the accumulation of free water or remove free water which may have been adventitiously introduced. The drying agent will then be present in the finished surface in its hydrated form if water was present. If any water is present the polyisocyanate reacts with it. The mixture is sufficiently stable for long periods of time so that it may be stored and shipped as needed. Thus, at the work site, a mixture is provided in a convenient form, which only requires the addition of (1) polyisocyanate and (2) preferably resilient aggregate to provide a castable resilient pavement. The mixture may then be blended conveniently with a plaster mixer or other mixing means and the polyisocyanate added either neat or as a solution in a hydrocarbon diluent after the resilient aggregate has been added. When substantial homogeneity is achieved, normally within a few minutes, the resulting composition may be applied to the surface to be coated. A suitable method for applying the surface is disclosed in U.S. Pat. No. 3,272,098.

Alternatively, the resilient surface may be prepared on a nonadhering base and then laid as a carpet onto the desired undersurface by means of a suitable adhesive or other holding mechanism.

The undersurface may be any of the common paving or undersurfaces for pavements such as asphalt concrete, Portland Cement concrete, macadam, etc. When the undersurface is porous or drains are installed, the resilient surface of this invention can be made porous by decreasing the amount of binder, i.e., the component containing polyurethane, and by increasing the amount of resilient aggregate.

Porous Structure

A porous surface is obtained by increasing the ratio of parts of resilient aggregate to parts of polyurethane to above about 5:1. The surface becomes progressively more porous as the relative amount of resilient aggregate increases. Above a ratio of about 23 parts of resilient aggregate to one part of polyurethane, the surface becomes too weak to be useful. A preferred range for the ratio of resilient aggregate to polyurethane when a porous structure is desired is from about 5 to about 10 parts of resilient aggregate per one part of polyurethane. Particularly preferred is a ratio of from about 6 to 8 parts of resilient aggregate to 1 part polyurethane. It should be noted that the amount of compaction, if any, during the formation of the surface also affects porosity.

When the surface formed using the subject invention is porous, is laid on a porous sub-base, and is combined with a grass-type carpet, a playing field is formed with the aesthetic and functional characteristics of the prior art surfaces but with the added advantage of porosity and maintenance of a dry playing field.

COMPONENTS

Polyols

The polyol is primarily a high molecular weight diol, although there may be minor amounts of higher order polyols present. The high molecular weight polyols will generally have at least 1,000 molecular weight and will not exceed about 5,000 molecular weight, preferably in the range of about 1,000 to 3,000 molecular weight, and more preferably from about 2,000 to about 2,800. Hydroxyl groups will usually be at or near (within about 4 carbon atoms) the terminal carbon atoms and be separated by chains of at least about 40 carbon atoms. The carbon chain is amorphous, that is, relatively free of crystallizable areas.

The hydrocarbon chain can be readily prepared by the polymerization of anionic addition polymerizable olefins using a metallo-organic catalyst. See, for example, Hayashi et al., *Journal of Polymer Science*, Part A, 2, 2571–2594 (64) and U.S. Pat. No. 3,055,952. The hydroxyl groups may be introduced at the terminal ends of the polymer, by oxidation, or addition of aldehydes, ketones or oxides. Preferably, the diols are primary alcohols. Free radical polymerization using hydrogen peroxide in an alcohol may also be used.

The polyols may be derived from monomers containing from 4 to 10 carbon atoms. Examples include butadiene, styrene, isoprene, alpha-methyl styrene, 4-butylstyrene, 2-ethylbutadiene, acrylonitrile, etc., and mixtures thereof.

Polymers useful in preparing the polyols include polybutadiene, polyisoprene, copolymers of butadiene and styrene, copolymers of butadiene and acrylonitrile and the like.

The polyols derived from these polymers include polybutadiene diol, polyisoprene diol, polybutadiene-styrene diol, polybutadiene-acrylonitrile diol and the like.

The high molecular weight polyols may have as much as 25 molar percent higher order (greater than di) polyols present, more usually not more than about 20 molar percent of higher order polyols. Usually, the higher order polyols will not be greater than triols.

The low molecular weight polyols, normally di- or triols, will generally have from about 2 to 12 atoms separating the most distant hydroxyl groups and will normally be of from about 2 to 18 carbon atoms. The atoms intermediate of the hydroxyl groups, besides carbon, may be oxygen, nitrogen, or sulfur. These polyols will normally be of from 6 to 18 carbon atoms having from 0 to 2 hetero atoms.

Mixtures of high molecular weight diols are also contemplated as useful in the subject invention. Also mixtures of one or more high molecular weight diols with one or more low molecular weight polyols are useful.

A preferred combination of polyols is a polybutadiene diols (average molecular weight of 2,500–2,800) and N,N-bis(2-hydroxypropyl)aniline. The combination is preferably used at a ratio of from 4 to 10 parts by weight of the polybutadiene diol to 1 part of the N,N-bis(2-hydroxypropyl)aniline.

Another preferred polyol combination is a mixture of a hydroxy terminated polybutadiene of about 1,400 molecular weight, a hydroxy terminated polybutadiene of about 2,900 molecular weight and N,N-bis(2-hydroxypropyl)aniline used at a weight ratio of 2-4:4–7:1 respectively.

Mineral Fillers

The mineral filler may be one or more of the common clays, limestone, sand, talcs, tripoli, silica, cement, etc. They may be used individually or admixed. The preferred fillers are non-absorptive fillers. The size of the filler may vary widely from about 20 mesh, U.S. standard sieve, to dust. Usually, the fillers will be of a size in the range of 30 to 300 mesh, U.S. standard sieve, and are preferably 200 mesh or smaller.

Resilient Aggregate

The resilient aggregate which is employed can be derived from both natural and synthetic rubbers or other resilient material. Rubber particles are available commercially as rubber buffings, as grindings from discarded tires, as polyurethane granules, etc. Other resilient material which may be employed include cork particles and sponge-rubber particles. The particular shape of the particles is not critical, but noddle shaped particles are preferred. The longest dimension generally will not exceed 1.0 inch and usually wil be from about 0.4 to 0.7 inch. Usually, all the resilient aggregate will pass through a No. 3 U.S. standard sieve, not more than 30 percent by weight will pass through a No. 16 U.S. standard sieve, and not more than 5% by weight will pass through a No. 30 U.S. standard sieve. Preferred aggregates have particles which predominantly approximate the average size.

Extender Oil

Only certain extender oils are suitable in the subject invention. The aniline point must be in the range of from about 75° to 130°F. and the viscosity should be in the range of from about 200 to 6,000 SUS at 100°F., preferably in the range of 300 to 2,500, and more preferably in some situations from about 1,400 to about 2,100. The oil, to be suitable for use in the system, should not bleed or exude after laydown and should have a relatively low viscosity to allow filler loading.

The volatility of the extender oil must be such that using a modified ASTM D-2288-64-T test not more than 10 percent by weight of the oil is lost. The modified test comprises placing 10 grams of the oil in an 80-mm. diameter cylindrical crystallizing dish having a height of 40 mm. and holding the system at 105°C. for 24 hours.

A particularly preferred extender oil is a sidecut from the manufacture of lube oils. The sidecut is extracted with an aromatic solvent, for example, phenol, and the resulting extract which is used has a viscosity of about 2,100 SUS at 100°F., and an aniline point of 100°F. The higher viscosity extender oils may also be used in combination with other lower viscosity extender oils to reduce the viscosity of the premix.

Polyisocyanates

The polyisocyanates will generally be diisocyanate or mixtures of diisocyanate with higher order polyisocyanates, normally not exceeding 5 isocyanate groups. Usually, in mixtures of di- and higher order polyisocyanates, the higher order polyisocyanates will be present in not more than 50 equivalent percent, usually not more than about 20 equivalent percent. Preferably diisocyanates are used. As already indicated, the higher order polyisocyanates (greater than di-) have at least 12 carbon atoms and usually do not exceed 46 carbon atoms, the diisocyanates generally varying from about 6 to 24 carbon atoms.

Illustrative polyisocyanates are diphenyldiisocyanate, bis(isocyanatophenyl)methane, 1,5-naphthalenediisocyanate, polyphenyl polymethyleneisocyanate (PAPI, supplied by Upjohn Co.), toluene diisocyanate, hexamethylene diisocyanate, dodecamethylene diisocyanate, 1,4-diisocyanatocyclohexane, etc. A particularly preferred polyisocyanate is poly(methylene phenylene polyisocyanate).

As already indicated, the polyisocyanates may be added to the premix composition either neato or in solution. When in solution, the polyisocyanates will generally be in a concentration of from about 30 to 80 weight percent.

Catalysts

Various catalysts may be used which are common for the curing of polyurethanes. These include dibutyl tin dilaurate, diazabicyclooctane, stannous octoate, etc. The dibutyl tin dilaurate is preferred.

Carbon Black

Carbon blacks having a mean particle diameter of from about 10 to about 70 millimicrons are suitable for use in the subject invention. The carbon black increases the hardness, tensile and tear strength, and weather resistance. Particularly preferred carbon blacks are those with a mean particle diameter of from about 20 to about 55 millimicrons.

The dispersion of the carbon black in the system is difficult due to its fine particle size and nature. Preferably, it is introduced into the extender oil prior to formation of the premix composition by circulating the oil and carbon black through a high shear pump or colloid mill.

Drying Agent

Other materials may also be added for specific purposes. Advantageously, a drying agent is used to minimize the amount of water present when the polyol and polyisocyanate are combined. The amount of drying agent will be from about 0.5 to about 5 weight percent (based on total composition), usually from about 1 to 4 weight percent. There will normally be about 0.01 to 0.5 part of drying agent per part of polyol. Illustrative drying agents include calcium oxide, calcium chloride, etc.

Plasticizers such as diisooctyl phthalate may also be used in minor quantities to reduce the viscosity of the premix.

The surface may be painted, once formed, using any paint which has sufficient strength and resilience to withstand spiked traffic and the like. Solvent-based paints having, for example, an acrylic cutback binder can be employed, as well as latex-based paints, vinyl acrylics, etc. Conveniently, a light thinner is used as the diluent when solvent-based paints are used. Various pigments may also be used to impart any desired color. Chromium oxide may be used when a green color is desired. Rubber aggregate can be sprinkled on the surface, becoming partially embedded in the polyurethane before curing, and can then be painted to give a textured grass-like appearance.

Alternately, the premix composition may be blended with the isocyanate and spread on any suitable substrate by spraying or squeezing a thin layer about one-sixteenth to one-eighth inch thick, and rubber aggregate can be sprinkled on the surface for texturing.

Rubber aggregate is used primarily for aesthetic purposes, providing a pleasant appearance and comfortable feeling underfoot. It also provides a good base for painting. Texturing, however, is not essential for skid resistance, the untextured surface having excellent traction, even when wet.

When spread in a thin layer as described above, other aggregates may be sprinkled into the surface, such as sand, rock chips, ground walnut shells, etc., to provide a sandpaper or rough surface texture, for walkways, garage decks, etc.

A fabric-type structure may also be adhered to the surface to give a grassy appearance while maintaining resilience of the structure.

A number of compositions were prepared and tested for their physical properties. The following examples are offered by way of illustration and not by way of limitation. All parts are by weight, unless otherwise specified.

Example 1

To a blender was added 1230 parts of an extender oil (having a viscosity of 2,100 SUS at 100°F. and an aniline point of 100°F.) which had been heated to 220°F., 125 parts of Raven 15 (a carbon black product of Columbia Carbon Company having a mean particle size of 27 millimicrons), 325 parts of a calcined clay, and 100 parts of calcium oxide. The system was mixed until uniform and then circulated through a Moyno pump until all solids were dispersed.

410 parts of polybutadiene diol (average molecular weight 2500-2800, sold as R-45 M by Arco Chemicals, Inc.), 50 parts of N,N-bis(2-hydroxypropyl)aniline, and 0.82 parts of dibutyl tin dilaurate as a catalyst were added to the blender and mixed until uniform. This mixture is defined herein as premix.

480 parts of rubber buffings of a size that 100 percent pass through a U.S. standard sieve No. 3, a maximum of 30 percent by weight pass through standard sieve No. 16, and a maximum of 5 percent by weight pass through a standard sieve No. 30, and having a maximum length of about 0.5 inch, were added. The entire composition was then blended until uniform.

Example 2

To 333 parts of the entire composition of Example 1 was added, with mixing, 15 parts of bis(isocyanatophenyl)methane (NCO-10 supplied by Kaiser Aluminum & Chemical Co.). The well-blended mixture was then laid down as a surface. The surface set up in about 2 hours. After 3 days at room temperature, the surface had the properties set forth below:

|  | 3 days at Room Temperature |
|---|---|
| Tensile Strength, psi | 113 |
| Elongation at break, % | 194 |
| Tear Strength, p/i | 24 |
| Hardness, Shore A | 27–32 |
| Shrinkage | None |

Example 3

A quantity of the premix from Example 1 was circulated through a gear pump and the same procedure as Example 2 was followed, with the following results:

|  | 1 day at Room Temperature |
|---|---|
| Tensile Strength, psi | 110 |
| Elongation at break, % | 240 |
| Tear Strength, p/i | 24 |
| Hardness, Shore A | 30–32 |
| Shrinkage | None |

The surface was then subjected to a torture test in which a spiked apparatus simulating a track shoe was impacted against the surface 5,000 times. Substantially no weight loss resulted and the surface remained in good condition.

Example 4

This example shows the effect of using different grades of carbon black.

Into a blender was placed 148 parts of the extender oil described in Example 1, 39 parts of calcined clay, 12 parts of calcium oxide, and 15 parts of Raven 15. This mixture was circulated through a gear pump for 5 minutes at a temperature between 180° and 220°F.

To the above mixture was added 58 parts of rubber buffings similar to those used in Example 1. The entire composition was then blended until uniform.

To this homogeneous mixture was added 49 parts of the polybutadiene diol, described in Example 1, 6 parts of N,N-bis-(2-hydroxypropyl)aniline, 0.1 parts of dibutyl tin dilaurate, and the entire composition was blended until uniform and allowed to stand for 24 hours.

15 parts of bis(isocyanatophenyl)methane was added to this composition with mixing, and a surface approximately three-fourth inch in thickness was formed. The surface had the properties shown in Test No. 1 of Table I below.

A similar procedure was followed with different carbon blacks, with the results shown in Table I.

TABLE I

| No. of Test | Carbon Black Used | Tests after 40 hours at Room Temperature | | | |
|---|---|---|---|---|---|
|  |  | Shore "A" Hardness | Tensile, psi | Elongation, break, % | Tear Strength, pounds/inch |
| 1 | Raven 15 | 28 | 139 | 175 | 25.4 |
| 2 | Statex F-12[1] | 29 | 134 | 180 | 25.5 |
| 3 | Statex 8-12[2] | 28 | 126 | 200 | 25.0 |
| 4 | Statex Black[3] | 22 | 106 | 210 | 20.1 |
| 5 | Molacco Black[4] | 24 | 107 | 215 | 18.4 |
|  |  | Tests after 40 hours at Room Temperature and 6 days at 140°F. | | | |
| 1 | Raven 15 | 46 | 192 | 130 | 19.0 |
| 2 | Statex F-12[1] | 46 | 196 | 140 | 14.2 |
| 3 | Statex B-12[2] | 42 | 160 | 153 | 16.5 |
| 4 | Statex Black[3] | 44 | 172 | 150 | 14.0 |
| 5 | Molacco Black[4] | 43 | 168 | 160 | 14.6 |
| 1 | Mean particle diameter of | 29 | millimicrons (product of Columbian Carbon Co.) | | |
| 2 | do. | 33 | do. | | |
| 3 | do. | 54 | do. | | |
| 4 | do. | 62 | do. | | |

Example 5

This example shows the effect on weathering of carbon black as a filler.

To a container was added 150 parts of the extender oil described in Example 1, 30 parts of Mollaco Black (a carbon black having a mean particle diameter of 62 millimicrons, product of Columbian Carbon Company), 30 parts of calcined clay, and 12 parts of calcium oxide. The mixture was blended with violent agitation using a Dispersator.

50 parts of the polybutadiene diol described in Example 1, 6 parts of N,N-bis(2-hydroxypropyl)aniline, and 0.1 part of dubutyl tin dilaurate were then added with mixing.

75 parts of rubber buffings of the type described in Example 1 were added and blended in by hand.

When the entire mixture was homogeneous, 15 parts of bis(isocyanatophenyl)methane was then added to the mixture and mixed by hand.

The composition was then cast to a thickness of one-half inch, allowed to set up and then subjected to a Weather Ometer (Trademark of Atlas Electric Devices, Inc.) test for 300 hours. The layer was then inspected under a magnifying glass for signs of weathering such as alligatoring, cracking, and loss of color. Using a scale of from 0 to 10 with 10 signifying total breakdown of the surface and 0 representing no change in appearance, the layer prepared had a rating of 0.

Examples 6 and 7

Using the same procedure as in Example 5, a surface was prepared having 151 parts of the same extender oil as in Example 1, 40 parts of the polybutadiene diol of Example 1, 5 parts of N,N-bis(2-hydroxypropyl)aniline, 0.2 parts of dibutyl tin dilaurate, 12 parts of calcium oxide, 75 parts of the same rubber buffings as Example 1, and 15 parts of bis(isocyanatophenyl)-methane.

The carbon black of Example 5 was replaced with 75 parts of a calcined aluminum silicate having a particle size of 1.8 microns and 1.2 microns in Examples 6 and 7, respectively.

Both of the surfaces prepared also had 7 parts of chromium oxide (a green pigment) to give the surface a grass-like color.

After 300 hours in the Weather Ometer, both the surfaces had a rating of 5, indicating that the surfaces had cracks readily discernible. Some alligatoring was also present.

Example 8

Using the procedure of Example 5, a surface was prepared having the following composition:

TABLE II 151 parts of the extender oil of Example 1
40 parts of the polybutadiene diol of Example 1
5 parts N,N-bis(2-hydroxypropyl)aniline
0.2 parts of dibutyl tin dilaurate
75 parts of MgO Clay
12 parts of CaO
7 parts of chromium oxide green pigment
75 parts of the rubber buffings of Example 1
15 parts of bis(isocyanatophenyl)methane After 300 hours in the Weather Ometer, the surface was badly cracked and was assigned a value of 7 on the scale of 0 to 10 of Example 5.

Example 9

To a blender with a propeller mixer was added 54.9 parts of the extender oil of Example 1, heated to a temperature of 220°F., 5.58 parts of carbon black having a mean particle diameter of 33 millimicrons, 14.5 parts of calcined clay, and 4.46 parts of calcium oxide.

After uniformity was obtained, 18.3 parts of the polybutadiene diol of Example 1, together with 2.2 parts of N,N-bis(2-hydroxypropyl)aniline and 0.036 parts of dibutyl tin dilaurate were added and the entire mixture was passed through a colloid mill.

This mixture is hereafter referred to in this example as the "premix."

To a plaster mixer was added 460 parts of this premix, 150 parts of rubber buffings of the type described in Example 1, and 25 parts of bis(isocyanatophenyl)methane and this mixture was then blended until uniform.

The mixture was then screeded to form a track long-jump runway. The screeded composition was then sprinkled with granules of the same rubber buffings.

After curing overnight, the excess granules were blown away and two coats of a green acrylic base paint were applied to the surface.

The properties of the runway were tested after a 1-day cure with the following results:

| Properties | (1-day cure) |
|---|---|
| Hardness, Shore A | 25-30 |
| Tensile Strength, psi | 85 |
| Elongation at break, % | 142 |
| Tear Strength, p/i | 11.5 |

Example 10

Using the premix of Example 9, 5.2 parts of bis-(isocyanatophenyl)methane and 94.8 parts of premix were blended together and varying amounts of rubber buffings were then added.

These mixtures were then formed into surfaces and tested with the results shown in Table III below for Tests Nos. 1-10. For Test No. 11, the same procedure was used, but 3.94 parts of the isocyanate, 72.4 parts of the premix and 23.6 parts of the rubber buffings were used. For Test No. 13, no rubber buffings were added to the same basic blend used in Tests 1-10.

TABLE III

| Test No. | Parts "Premix" + Isocyanate | Parts Rubber Buffings | Tear Strength p/i | Tensile Strength p.s.i. | Elongation at Break,% | Compressive Hardness in psi for Reduction of Thickness to 75% of Original | Porosity (Defined as Allowing 1" Head of Water to Drain in 2 min. or less) |
|---|---|---|---|---|---|---|---|
| 1 | 5 | 95 | Too weak to give reproducible results or usable surfaces | | | | |
| 2 | 10 | 90 | do. | | | | |
| 3 | 15 | 85 | 1.0 | 10 | 73 | 10 | Porous |
| 4 | 20 | 80 | 2.0 | 16 | 130 | 9 | do. |
| 5 | 25 | 75 | 9.0 | 38 | 133 | 20 | do. |
| 6 | 30 | 70 | 9.0 | 37 | 130 | 24 | do. |
| 7 | 35 | 65 | 11.0 | 41 | 135 | 31 | do. |
| 8 | 40 | 60 | 14.0 | 51 | 187 | 48 | do. |
| 9 | 45 | 55 | 21.0 | 76 | 157 | 64 | do. |
| 10 | 50 | 50 | 18.0 | 76 | 160 | 69 | barely porous |
| 11 | 62 | 38 | 30.0 | 131 | 145 | 104 | do. |
| 12 | 76,4 | 23,6 | 19.0 | 108 | 195 | 73 | non-porous |
| 13 | 100 | | 10.0 | 61 | 215 | 34 | do. |

Example 11

Using the premix of Example 9, rheological tests were run to determine the non-flow or gelation properties of the system. A Brookfield Viscometer Model RVF with a No. 5 spindle was employed. The viscometer was operated at 2 and 4 rpm, with the following results: Viscosity of Premix 2 rpm/17,200 cp. 4 rpm/13,800 cp.

A Brookfield Yield Value was determined by dividing the viscosity in centipoise at 2 rpm, minus the viscosity in centipoise at 4 rpm by 100, thereby obtaining a value of 34. This Brookfield Yield Value obtained is indicative of the non-flow properties of the composition after addition of the polyisocyanate and resilient aggregate. A mixture having the proportions of the screeded composition of Example 9 when laid down as a ¾ inch mat was found to have nonsag properties when applied to a surface having a slope of 3 inches in 10 feet.

Example 12

A cured surface having the composition of the screeded composition of Example 9 was subjected to a flammability test, described as ASTM, "Proposed Tentative Method of Test for Determination of the Self-Extinguishing Properties of Finished Textile Floor Covering Materials," draft of Mar. 12, 1969.

The test specifies using an ignited Methenamine Pill, Eli Lilly No. 1588, as a controlled heat source to determine if fire will spread on the test material to a diameter of 6 inches.

The composition described above passed this test.

It is evident from the aforesaid results that the compositions of this invention are useful in preparing resilient pavements which have good tensile properties and which cure rapidly at ambient temperatures to a useful surface. The resilient surfaces have good tear strength and nonskid qualities. Furthermore, it is found that the pavements are not slippery even when wet.

Where injury occurs to the surface, the surface is readily repaired without leaving any discontinuity in the surface. The pavements are found to have a good temperature profile in not becoming brittle at −10°F. or too soft at 140°F. Furthermore, the compositions substantially maintain the good tensile properties across the temperature range indicated above, subject to some decrease at high temperature while maintaining resiliency.

The compositions can be used for other uses than recreational surfaces, such as accoustical tile or sheeting, insulation, non-woven rugs, protective sheeting, etc. The products proposed by the invention are attractive; form good bonds with paint; are durable; easily prepared with available equipment without significant hazard to the operators; readily bond to a variety of surfaces, e.g., aggregate, concrete, wood, etc.; and are not significantly sensitive to weather conditions.

Example 13

To a ribbon blender was added 650 parts of an aromatic oil having viscosity at 100°F. of 1,350 SSU and an aniline point of about 92, 976 parts of an aromatic oil having a viscosity at 100°F. of 300 SSU and an aniline point of about 123, 100 parts of Statex F-12 carbon black in beaded form, 150 parts calcium oxide, 425 parts calcined clay, 333 parts of a hydroxy terminated polybutadiene having a molecular weight of 1,380, 554 parts of a hydroxy terminated polybutadiene having a molecular weight of 2,900, 94 parts of N,N-bis(2-hydroxypropyl)aniline, and 1 part dibutyl tin dilaurate. Prior to addition of the polyols and dibutyl tin dilaurate, the other premix ingredients were blended to a uniform mixture and then run through a colloid mill to fully disperse the carbon black, quick lime, and clay into the oils. Utilizing the premix having the composition as set forth above, a cast surface was prepared by blending 470 parts of the premix, 125 parts of resilient aggregate, 100 percent of which will pass a No. 4 sieve, and 35 parts of NCO-10. The resulting surface had the properties set forth below.

| Shore "A" Hardness | 34-40 |
|---|---|
| Tensile Strength | 117 psi |
| Elongation | 220% |
| Tear Strength | 27 lbs/in |

Example 14

A premix having a viscosity of 7,500 centipoises measured on a Brookfield viscometer at 20 rpm was prepared by blending 104 parts of an aromatic oil having a viscosity at 100°F. of 1,350 SSU, 26 parts of an aromatic oil having a viscosity at 100°F. of 300 SSU, 6.5 parts of Statex F-12 carbon black in beaded form, 11.2 parts of quick lime, 52 parts of a calcined clay, 46 parts of a polybutadiene diol (average molecular weight 2,500–2,800, sold as R-45M by Arco Chemicals, Inc.), 7.6 parts of N,N-bis(2-hydroxypropyl)aniline, and 0.1 part of dibutyl tin dilaurate. Prior to the addition of the diol, aniline and dibutyl tin dilaurate, the other premix ingredients are milled in a gear pump to insure through dispersion of the solid ingredients in the oil.

A surface casting was prepared using 470 parts of the premix described above, 150 parts of resilient aggregate, 100 percent of which will pass through a No. 4 sieve, and 29 grams of NCO-10. The resulting composition prior to setup had a viscosity of 19,500 centipoises at 77°F. as measured on a Brookfield viscometer with a No. 5 spindle at 20 rpm.

After setup the cast surface had the properties set forth below.

| Shore "A" Hardness | 35-40 |
|---|---|
| Tensile Strength | 102 psi |
| Elongation | 143% |
| Tear Strength | 17.2 lbs/in |

The formulations and tests set forth in Examples A and 15 through 17, below, demonstrates the relationship of resilient aggregate size and shape to the surface strength.

Example A - Premix Preparation

A quantity of a premix of all the components except the resilient aggregate and the isocyanate was prepared by mixing together in the ratio indicated, 51.3 parts of an extender oil (having a viscosity of 2100 SUS at 100°F. and an aniline point of 100°F.) which had been preheated to 220°F., 4.5 parts of calcium oxide, 2.6 parts of a carbon black having a mean particle size of

TABLE 15B

Viscosity in Centipoise of Mixture of Premix and Resilient Aggregate

| Formulation | A | B | C | D | E |
|---|---|---|---|---|---|
| Spindle No. | 6 | 6 | 6 | 7 | 7 |
| 2 RPM | 36,000 | 40,000 | 141,000 | 514,000 | 1,640,000 |
| 4 RPM | 28,750 | 33,750 | 103,750 | 350,000 | 980,000 |
| 20 RPM | 20,500 | 24,500 | 48,000 | 162,000 | >200,000 |

29 millimicrons, 20.5 parts of a calcined clay, 18.2 parts of a polybutadiene diol (average molecular weight 2500 to 2800), 3.0 parts of N,N-bis(2-hydroxypropyl)aniline, and 0.04 parts of dibutyl tin dilaurate as a catalyst. Vigorous agitation was continued until uniformity was obtained. This composition is referred to hereinafter as the premix.

Example 15

Effect of Resilient Aggregate Gradation on the Physical Properties of the Polyurethane Surface To 235 parts of the premix was added 75 parts of various resilient aggregates (rubber buffings from tires) having the gradations indicated in Table 15A below. The gradations are indicated by two numbers. The smaller number is the largest U.S. Standard Sieve required to pass all the material. The larger number is the largest U.S. Standard Sieve through which none of the resilient aggregate will pass.

TABLE 15A

Composition of Premix and Resilient Aggregate Mixture

| Formulation | A | B | C | D | E |
|---|---|---|---|---|---|
| Premix, Parts | 235 | 235 | 235 | 235 | 235 |
| Resilient Aggregate, parts of each gradation | | | | | |
| 4 × 8 | 9.9 | | | | |
| 8 × 16 | 54.2 | | | | |
| 16 × 30 | 10.8 | 75 | | | |
| 30 × 50 | 0.1 | | 75 | | |
| 50 × 100 | 0.1 | | | 75 | |
| 100 × 200 | 0.0 | | | | 75 |

In formulation A the 4 × 8 sample was comprised of particles in which the ratio of length to the longest cross-sectional dimension was between about 4 and 25 with the majority having a ratio of about 5 to 10. The 8 × 16 sample and length to cross-sectional dimension ratios of about 2.5 to 7 with the majority being between about 3 and 6. In formulations B-E the particles had all dimensions approximately equal.

The viscosities of the mixtures of premix and resilient aggregate were determined at 77°F. on a Brookfield Viscometer Model RVF with the spindles and at the revolutions per minute indicated in Table 15B.

The mixtures of 235 parts of premix and 75 parts of the various aggregate were cured with 15 parts of bis-(isocyanatophenyl)methane (supplied by Kaiser Aluminum and Chemical Co. as NCO-10) at room temperature overnight and then at 160°F. for 1 day. The various physical properties were determined as indicated above and are shown in Table 15C.

TABLE 15C

Physical Properties of Polyurethane Surfaces Containing Different Gradations of Resilient Aggregate

| Formulation | A | B | C | D | E |
|---|---|---|---|---|---|
| Tensile Strength, psi | 121 | 134 | 141 | 128 | 150 |
| Elongation, % at break | 195 | 250 | 220 | 205 | 225 |
| Tear strength, pounds/inch | 13.7 | 9.8 | 9.1 | 8.7 | 8.6 |
| Hardness, Shore A | 40 | 41 | 43 | 43 | 39 |
| Resilience, % rebound | 43 | 42 | 45 | 46 | 45 |

The physical properties of the oil-extended resilient polyurethane surfaces (formulations B-E) shown in Table 15C are approximately the same as the surfaces (formulation A) shown above with the exception of low tear strength. Tear strength is an important property since recreational surfaces are often subjected to tearing-type traffic such as spiked running shoes, etc.

Example 16

In addition to the low tear strength obtained in Example 15, the viscosities of the mixture of rubber and premix were too high for workability in the field except for formulations A and B. A viscosity of about 15,000 to 35,000, preferably about 20,000 to 25,000 centipoise is necessary for ease of handling and application.

For this reason a series of surfaces were prepared in which the quantity of resilient aggregate added to the premix was varied to yield a mixture having a viscosity of about the necessary range. The formulations obtained are shown in Table 16A.

TABLE 16A

Composition of Premix and Resilient Aggregate Mixture

| Formulation | A | B | C | D | E |
|---|---|---|---|---|---|
| Premix, parts | 235 | 235 | 235 | 235 | 235 |
| Resilient aggregate, parts of each gradation | | | | | |
| 4 × 8 | 9.9 | | | | |
| 8 × 16 | 54.2 | | | | |
| 16 × 30 | 10.8 | 75 | | | |
| 30 × 50 | 0.1 | | 51 | | |
| 50 × 100 | 0.1 | | | 45 | |
| 100 × 200 | 0.0 | | | | 26 |

The viscosities of these formulations were determined as in Example 15 and are shown in Table 16B.

TABLE 16B

Viscosity in Centipoise of Mixture of Premix and Resilient Aggregate

| Formulation | A | B | C | D | E |
|---|---|---|---|---|---|
| Spindle No. | 6 | 6 | 6 | 6 | 6 |
| 2 RPM | 35,000 | 44,000 | 35,500 | 49,000 | 47,500 |
| 4 RPM | 27,750 | 34,000 | 28,000 | 39,700 | 36,000 |
| 20 RPM | 21,000 | 24,000 | 20,000 | 26,000 | 24,200 |

As in Example 15, the mixtures of 235 parts of premix and various quantities of resilient aggregate as shown in Table 16A were cured with 15 parts of the bis(isocyanatophenyl)methane. The physical properties were determined as above and are shown in Table 16C.

TABLE 16C

Physical Properties of Polyurethane Surfaces Containing Different Gradations of Resilient Aggregate — Viscosity Held Constant

| Formulation | A | B | C | D | E |
|---|---|---|---|---|---|
| Tensile strength, psi | 106 | 103 | 108 | 118 | 122 |
| Elongation, % at break | 230 | 200 | 250 | 255 | 235 |
| Tear strength, pounds/inch | 12.4 | 6.6 | 6.4 | 5.5 | 5.8 |
| Hardness, Shore A | 38–42 | 40–42 | 35–37 | 35–37 | 35–37 |
| Resilience, % rebound | 45 | 44 | 42 | 43 | 43 |

The data of Examples 15 and 16 demonstrate that a resilient surface of the type prepared will have greatly decreased tear strength when the bulk of the resilient aggregate passes a No. 16 U.S. Standard Sieve and have roughly equidimensional shape. This is particularly so when the quantity of small particle size aggregate is reduced to yield a workable mixture capable of easy application in the field.

Example 17

Following the procedure of Example 15, four resilient surfaces were prepared from 235 parts of the premix, 75 parts of resilient aggregate as shown in Table 17A, and 15 parts of the isocyanate. The resilient aggregate labeled 4 × 8, 8 × 16, and 16 × 30(S) had approximately the same dimensions as described in Example 15. The sample labled 16 × 30(L) had a length-to-cross-sectional dimension ratio of about 5 to 15 with the majority having a ratio of about 8 to 12. The properties of these surfaces were determined as described above and are shown in Table 17A.

TABLE 17A

Effect of Resilient Aggregate Gradation and Length on Tear Strength of Surface

| Aggregate Gradation | 4×8 | 8×16 | 16×30(S) | 16×30(L) |
|---|---|---|---|---|
| Tensile Strength, psi | 120 | 113 | 114 | 118 |
| Elongation,% at break | 160 | 130 | 165 | 140 |
| Tear Strength, lbs./in. | 16.2 | 11.6 | 7.8 | 10.4 |
| Hardness, Shore A | 43 | 42 | 38 | 40 |
| Resilience, % rebound | 45 | 46 | 46 | 46 |

The above data demonstrates that although higher length-to-cross-sectional dimension ratios of the smaller aggregate particles (e.g., the 16 × 30 size) contribute to the tear strength when compared to roughly equidimensional particles of the same gradation, a greater contribution to tear strength is made by resilient aggregate of the larger gradation, particularly that of the 4 × 8 size. It is to be noted that the tear strength of the resilient surface containing the 16 × 30(S) particles is approximately the same as the tear strength of the elastomer without any resilient aggregate. Thus, it may be seen that the finely divided resilient aggregate does not enhance the tear strength of the elastomer in which it is incorporated.

It is apparent that different embodiments may be made without departing from the scope and spirit thereof; and, therefore, it is not intended to be limited, except as indicated in the appended claims.

We claim:

1. A resilient surface up to about 2 inches in thickness prepared from a workable mixture consisting essentially of 1 part by weight of a polyurethane prepared in situ from a polyisocyanate and a polyol, wherein said polyol is at least 50% by weight of a diol of from 1,000 to 5,000 molecular weight selected from polybutadiene diols, polyisoprene diols, polybutadiene-styrene diols and polybutadiene-acrylonitrile diols and said polyisocyanate is used in an equivalent ratio of from 0.8 to 1.50 isocyanate groups to one hydroxyl group from said polyol, (2) from 0.6 to about 4.5 parts by weight of an extender oil having an aniline point in the range of from about 75° to 130°F and a viscosity of from about 200 to 6,000 SUS at 100°F, (3) from about 0.25 to about 4.5 parts by weight of resilient aggregate, wherein said resilient aggregate has a maximum dimension of not more than 1.0 inch, all of which will pass through a No. 3 U.S. standard sieve, not more than 30% by weight of which will pass through a No. 16 U.S. standard sieve, and not more than 5% by weight of which will pass through a No. 30 U.S. standard sieve, (4) from 0 to about 1.8 part mineral filler having a size in the range of 20 mesh, U.S. standard sieve to dust, (5) from 0 to about 0.5 part drying agent or its hydrated form, (6) from 0 to about 0.5 part of a polyurethane catalyst, and (7) from 0.08 to about 0.45 part carbon black; wherein said extender oil is present in an amount of from about 12 to about 60 weight percent of the total composition and said polyurethane is present in an amount of from about 5 to about 35 weight percent of the total composition.

2. Claim 1, wherein said polyol has from 5 to 20 weight percent of the total polyol of a short-chain polyol of from 2 to 3 hydroxyl groups having not more than about 12 atoms separating the most distant hydroxyl groups and having a molecular weight in the range of 62 to 300.

3. Claim 1, wherein said high molecular weight polyol is a diol of from 2,000 to 4,000 molecular weight derived from the polymerization of butadiene.

4. Claim 1, wherein said high molecular weight polyol is a mixture of hydroxy terminated polybutadienes having molecular weights of about 1,400 and about 2,900 respectively, used at a ratio of from 2 to 4 parts by weight based on the combined weight of all the polyols of the said 1,400 molecular weight polybutadiene to 4-7 parts by weight based on the combined weight of all the polyols of the said 2,900 molecular weight polybutadiene with the further proviso that 1 part by weight of N,N-bis(2-hydroxypropyl)-aniline based on the combined weight of all the polyols is also present.

5. Claim 1, wherein said polyisocyanate is of from 6 to 46 carbon atoms, and is at least 50 equivalent percent diisocyanate.

6. Claim 1, wherein (1) said extender oil is present in an amount of from about 1.5 to 3 parts by weight, (2) said resilient aggregate is present in an amount of from about 0.75 to about 2.5 parts by weight, (3) said mineral filler is present in an amount of from 0.3 to 1.0 part by weight, (4) said carbon black is present in an amount of from about 0.1 to 0.3 part by weight.

7. Claim 6, wherein said polyurethane is derived from a polyol which is a mixture having from 80 to 95 weight percent of a polybutadiene diol of from 2,000 to 4,000 molecular weight and from 5 to 20 weight percent of a polyol of from 2 to 3 hydroxyl groups and from 62 to 300 molecular weight and at least 1 polyisocyanate selected from the group consisting of 4,4'-methylene diphenyl diisocyanate, tolylene diisocyanate and 4,4'-diphenyl diiocyanate.

8. Claim 7, wherein said extender oil has a viscosity of 300 to 2,500 SUS at 100°F., and is present in an amount of from about 20 to about 50 weight percent and said polyurethane is present in an amount of from about 10 to about 25 weight percent.

9. Claim 1, wherein (1) said polyisocyanate is bis-(isocyanatophenyl)methane, (2) said polyol is a mixture of 333 parts of a hydroxy terminated polybutadiene having a molecular weight of 1,380, 554 parts of a hydroxy terminated polybutadiene having a molecular weight of 2,900, and 94 parts of N,N-bis(2-hydroxypropyl) aniline, and (3) said extender oil has a viscosity of 1,350 SSU at 100°F.

10. A resilient surface up to about 2 inches in thickness prepared from a workable mixture consisting essentially of (1) 1 part by weight of a polyurethane prepared in situ from a polyisocyanate and a polyol, wherein said polyol is at least 50 percent by weight of a diol of from 1,000 to 5,000 molecular weight selected from polybutadiene diols, polyisoprene diols, polybutadiene-styrene diols and polybutadiene-acrylonitrile diols and said polyisocyanate is used in an equivalent ratio of from 0.8 to 1.50 isocyanate groups to 1 hydroxyl group from said polyol, (2) from 0.6 to about 4.5 parts by weight of an extender oil having an aniline point in the range of from about 75° to 130°F and a viscosity of from about 200 to 6,000 SUS at 100°F, (3) from about 5 to about 23 parts of resilient aggregate, wherein said resilient aggregate has a maximum dimension of not more than 1.0 inch, all of which will pass through a No. 3 U.S. standard sieve, not more than 30% by weight of which will pass through a No. 16 U.S. standard sieve, and not more than 5% by weight of which will pass through a No. 30 U.S. standard sieve, (4) from about 0 up to about 1.8 parts mineral filler having a size in the range of 20 mesh, U.S. standard sieve to dust, (5) from 0 to about 0.5 part drying agent or its hydrated form, (6) from 0 to about 0.5 part of a polyurethane catalyst, and (7) from 0.08 to about 0.45 part carbon black.

11. A method of forming a resilient surface which comprises (A) combining (1) a premix containing at least one polyol, (2) a diisocyanate which is capable of reacting with said polyol to form a polyurethane in situ and (3) a resilient aggregate, (B) spreading the mixture of said polyol containing premix composition, said diisocyanate, and said resilient aggregate over a surface to a thickness of about one-eighth to about 2 inches to set rapidly to a firm, tough resilient surface, wherein said polyol-containing premix compositions consist essentially of (1) one part of a polyol, being predominantly a diol of from 1,000 to 5,000 molecular weight selected from polybutadiene diols, polyisoprene diols, polybutadienestyrene diols and polybutadiene-acrylonitrile diols, (2) from 1 to 5 parts of an extender oil having an aniline point in the range from about 75° to 130°F and a viscosity of about 200 to 6,000 SUS at 100°F, (3) from 0 to 2 parts of mineral filler having a size in the range of 20 mesh, U.S. standard sieve to dust, (4) from 0.15 to 0.5 part of carbon black, (5) from 0 to 0.5 part of a drying agent, and (6) from 0 to 0.5 part of a catalyst, said premix composition having a viscosity in the range of 4,000 to 100,000 centipoise at 77°F and a Brookfield yield value of at least about 10; wherein said diisocyanate has at least 6 carbon atoms and not more than 46 carbon atoms and wherein the equivalent ratio of isocyanate to hydroxyl groups is in the range of 0.95–1.5 to 1; and wherein said resilient aggregate has a maximum dimension of not more than 1.0 inch, all of which will pass through a No. 3 U.S. standard sieve, not more than 30% by weight of which will pass through a No. 16 U.S. standard sieve, and not more than 5% by weight of which will pass through a No. 30 U.S. standard sieve, and wherein the weight ratio of said resilient aggregate to said polyurethane prepared from said polyol and said diisocyanate is in the range of 0.25–4.5 to 1.

* * * * *